United States Patent
Fiorese et al.

(10) Patent No.: US 11,704,354 B2
(45) Date of Patent: Jul. 18, 2023

(54) METHOD OF MANAGING MEDIA LIBRARIES, CORRESPONDING SYSTEM AND COMPUTER PROGRAM PRODUCT

(71) Applicant: STMicroelectronics S.r.l., Agrate Brianza (IT)

(72) Inventors: Davide Silvio Fiorese, Sesto San Giovanni (IT); Riccardo Parisi, Milan (IT)

(73) Assignee: STMicroelectronics S.r.l., Agrate Bhanza (IT)

( * ) Notice: Subject to any disclaimer, the term of this patent is extended or adjusted under 35 U.S.C. 154(b) by 120 days.

(21) Appl. No.: 17/158,636

(22) Filed: Jan. 26, 2021

(65) Prior Publication Data
US 2021/0286836 A1 Sep. 16, 2021

(30) Foreign Application Priority Data
Mar. 11, 2020 (IT) .......................... 102020000005143

(51) Int. Cl.
*G06F 16/40* (2019.01)
*G06F 16/41* (2019.01)
*G06F 16/44* (2019.01)

(52) U.S. Cl.
CPC .............. *G06F 16/41* (2019.01); *G06F 16/44* (2019.01)

(58) Field of Classification Search
CPC ................................. G06F 16/41; G06F 16/44
See application file for complete search history.

(56) References Cited

U.S. PATENT DOCUMENTS

| | | |
|---|---|---|
| 2008/0147747 A1 | 6/2008 | Cardamore |
| 2009/0326949 A1 | 12/2009 | Douthitt et al. |
| 2020/0265011 A1* | 8/2020 | Liu .................. G06F 16/185 |

FOREIGN PATENT DOCUMENTS

EP 1548741 A1 6/2005

OTHER PUBLICATIONS

Kovacevic, B. et al., "A Java Application Programming Interface for In-Vehicle Infotainment Devices", IEEE Transactions on Consumer Electronics, New York, NY, US, vol. 1, 63, No. 1, Feb. 1, 2017, pp. 68-76, XP011649761.

* cited by examiner

*Primary Examiner* — Kristopher Andersen
(74) *Attorney, Agent, or Firm* — Slater Matsil, LLP

(57) ABSTRACT

In accordance with an embodiment, a method of managing an automotive infotainment media library, in which media content files sourced from a set of source devices, and the media content files are accessible via respective playback paths by at least one media player application having a plurality of configurations, includes: parsing the media content files in the media library to create at least one indexed table including a respective list of identifiers associated to media content files, wherein the media content files are parsed as a function of at least one of a source device in the set of source devices, as a function of a configuration in the plurality of configurations of the at least one media player application, or as a function of folders grouping the media content files in the media library.

20 Claims, 7 Drawing Sheets

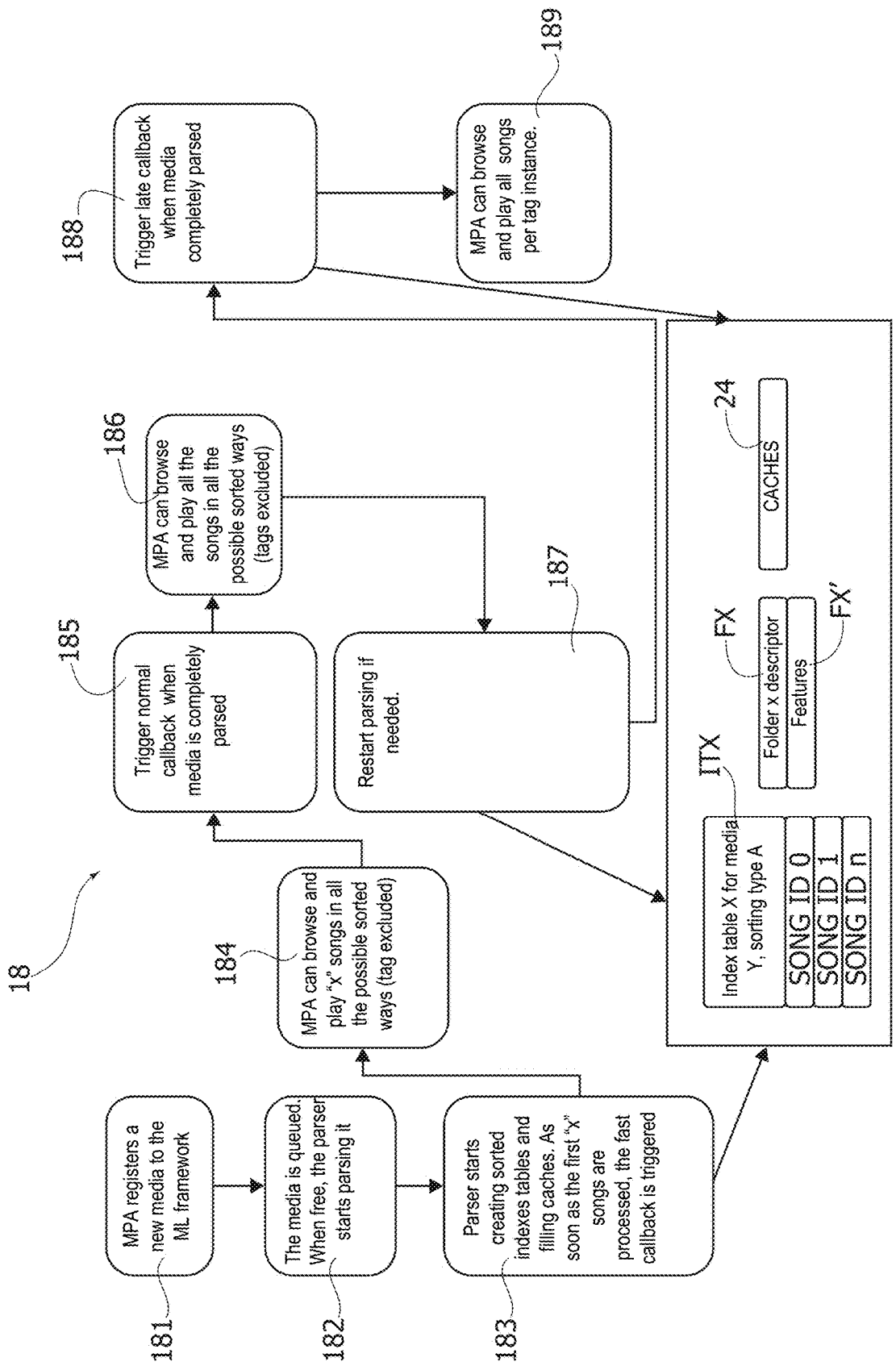

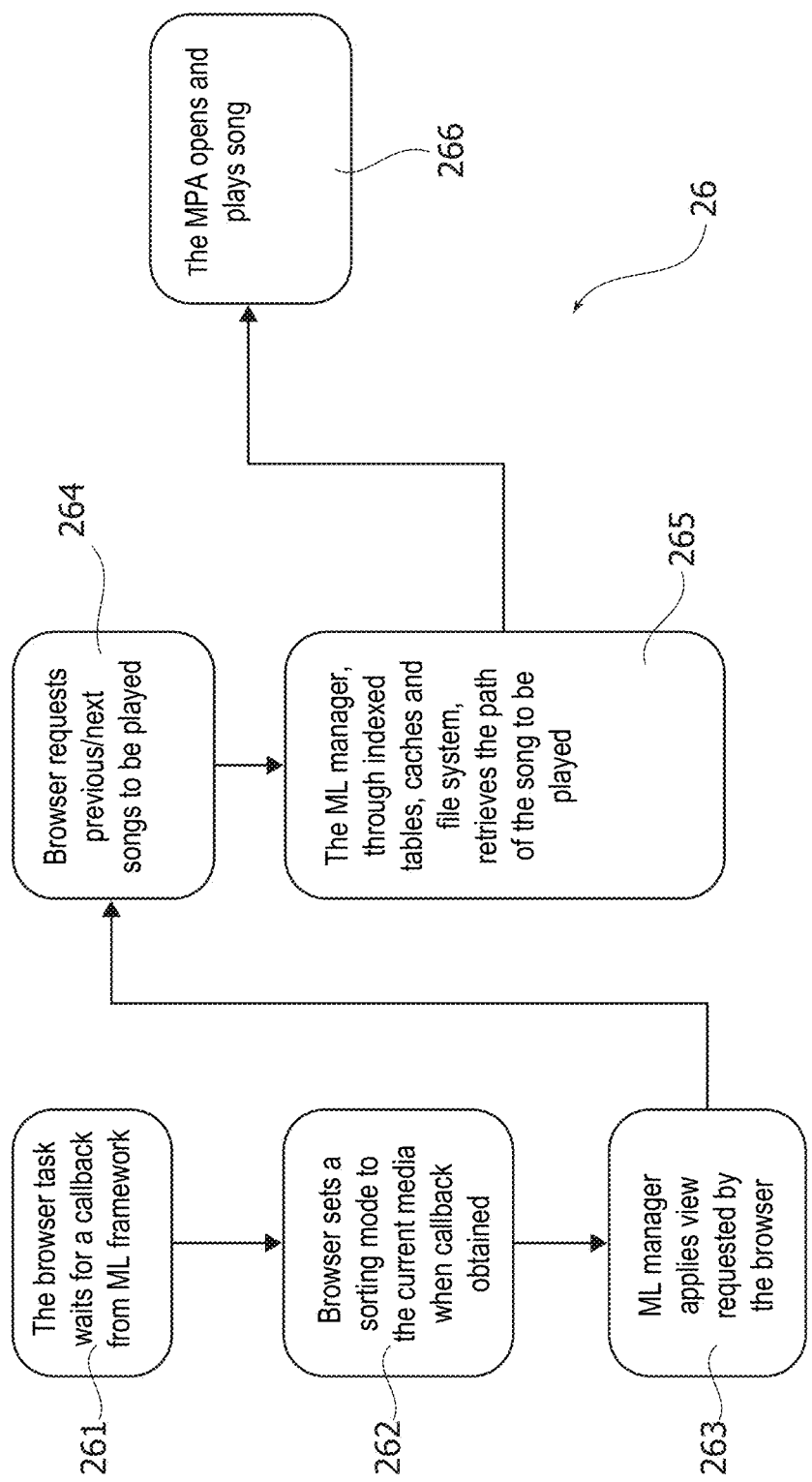

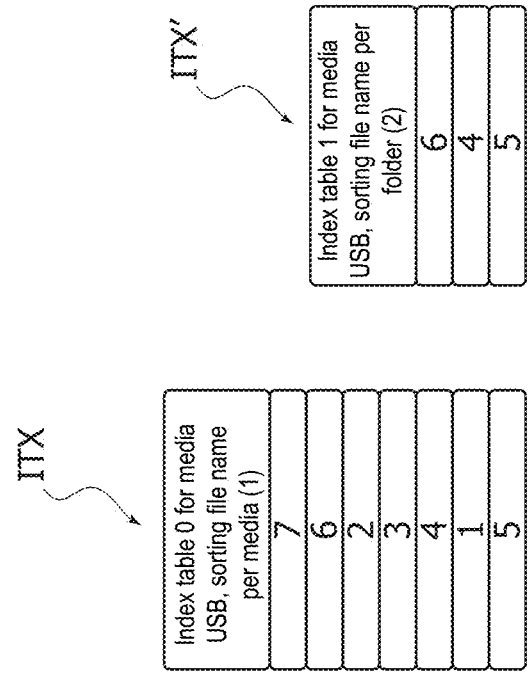

METHOD OF MANAGING MEDIA LIBRARIES, CORRESPONDING SYSTEM AND COMPUTER PROGRAM PRODUCT

CROSS-REFERENCE TO RELATED APPLICATIONS

This application claims priority to Italian Patent Application No. 102020000005143, filed on Mar. 11, 2020, which application is hereby incorporated herein by reference in its entirety.

TECHNICAL FIELD

The description relates to managing media libraries, a corresponding system, and a computer program product.

BACKGROUND

Over the last few years, infotainment systems for use in the automotive sector have been the subject of improvement and development well beyond conventional car radio and car audio systems.

Devices of the Accordo™ family of devices available with companies of the STMicroelectronics group and the eT-Kernel RTOS board support package (eT-Kernel being an eSOL Corporation standardization of uITRON RTOS) are exemplary of such developments of infotainment systems for the automotive sector.

A so-called media library (ML) application is part of the middleware layer in a software turn-key solution coupled with a media player application (MPA) in infotainment systems for the automotive sector. Operation of a media player in such a system (an audio player to reproduce songs can be referred to by way of non-limiting example) is based on a file system path to that song, which can be played (reproduced) via various possible file system mount points.

Various types of devices, such as USB devices, secure digital multimedia cards (SDMMC), NAND memories, in-app (iAP) purchase devices, media transfer protocol (MTP) devices or RAM disks are (non-limiting) examples of such devices which can provide particular media content to a user once a path to that content is provided via the file system.

Whatever the source involved, the media player is in a position to make the media contents available (playing a song, for instance) in a customized way, for instance, sorted according to certain criteria, with a certain purpose; and in a scalable way, that is with an increased number of features provided as a function of the amount of memory available in the system. The media player may be controlled by a high-level customer application layer. The ability for the media library to provide a set of advanced application program interfaces (APIs) to manipulate files in compliance with customer specifications is a desired feature in such infotainment systems.

It is noted that in the context considered herein the designation "customer" primarily designates the manufacturer/installer of an infotainment system, while the designation "user" applies to the (end) user of the system such as a car driver/passenger, for instance.

Especially in entry-level systems, optimizing (and reducing) the Bill of Materials (BOM) is a desirable goal to pursue for customers. Reducing BOM specifications oftentimes involves a reduction (and even a total removal) of external memory support which may inevitably affect the room available for software applications (primarily for middleware). For instance, certain conventional arrangements may comprise just 1.2 Mbyte of (internal) RAM space, while other conventional solutions rely on several Mbytes just for media management and the associated databases (DBs).

In fact, being able to provide a customized view of media contents (with a customer's own "flavor") is a desirable feature. Also, customers (and users as well) reasonably expect that system performance should not be reduced below certain levels: for instance, a certain song (be it a "first" song or a next/previous song desired to be reproduced) should be reproduced without undue delays perceived by the user.

Certain media library engines maintain a full database of song paths in a volatile memory, with instance. Such an approach involves maintaining a database manager in the volatile memory as well (as a structured query language or SQL, for instance). The corresponding increase in volatile memory space dedicated to media library storage inevitably translates into a BOM increase, which may be unacceptable for many applications.

SUMMARY

In accordance with an embodiment, a method of managing an automotive infotainment media library comprising media content files sourced from a set of source devices, where the media content files are accessible via respective playback paths by at least one media player application having a plurality of configurations, includes: parsing the media content files in the media library to create at least one indexed table including a respective list of identifiers associated to media content files, wherein the media content files are parsed as a function of at least one of a source device in the set of source devices, as a function of a configuration in the plurality of configurations of the at least one media player application, or as a function of folders grouping the media content files in the media library; and activating the at least one media player application to access via respective playback paths media content files having associated thereto identifiers listed in the at least one indexed table.

In accordance with another embodiment, A managing system for an automotive infotainment media library comprising media content files sourced by a set of source includes: parser circuitry configured to parse the media content files in the media library to create at least one indexed table including a respective list of identifiers associated to media content files parsed as a function of at least one of a source device in the set of source devices and/or a configuration in a plurality of configurations of at least one media player application and/or folders wherein the media content files are arranged in the media library; memory circuitry for at least temporarily storing the at least one indexed table; and browser circuitry to retrieve and make available to the at least one media player application, via respective playback paths, media content files in the media library having associated thereto identifiers listed in the at least one indexed table.

In accordance with a further embodiment, a non-transitory computer readable medium having stored thereon instructions that, when executed by a processor, causes the processor to manage an automotive infotainment media library comprising media content files sourced from a set of source devices by executing steps comprising: parsing the media content files in a media library to create at least one indexed table including a respective list of identifiers associated to media content files, wherein the media content files are accessible via respective playback paths by at least one media player application having a plurality of configurations, and wherein the media content files are parsed as a function of at least one of a source device in the set of source devices, as a function of a configuration in the plurality of configurations of the at least one media player application, or as a function of folders grouping the media content files in the media library; and activating the at least one media player application to access via respective playback paths media content files having associated thereto identifiers listed in the at least one indexed table.

BRIEF DESCRIPTION OF THE DRAWINGS

One or more embodiments will now be described, by way of example only, with reference to the annexed figures, wherein:

FIG. 4 is a functional block diagram exemplary of operation of a parser included in embodiments as per the present description, FIG. 5 is a functional block diagram exemplary of operation of a browser included in embodiments as per the present description, FIGS. 7 and 8 are exemplary sequences of parsing in embodiments as per the present description, and FIG. 9 is exemplary of a table which can be generated in embodiments as per the present description.

DETAILED DESCRIPTION OF ILLUSTRATIVE EMBODIMENTS

Figure 1:
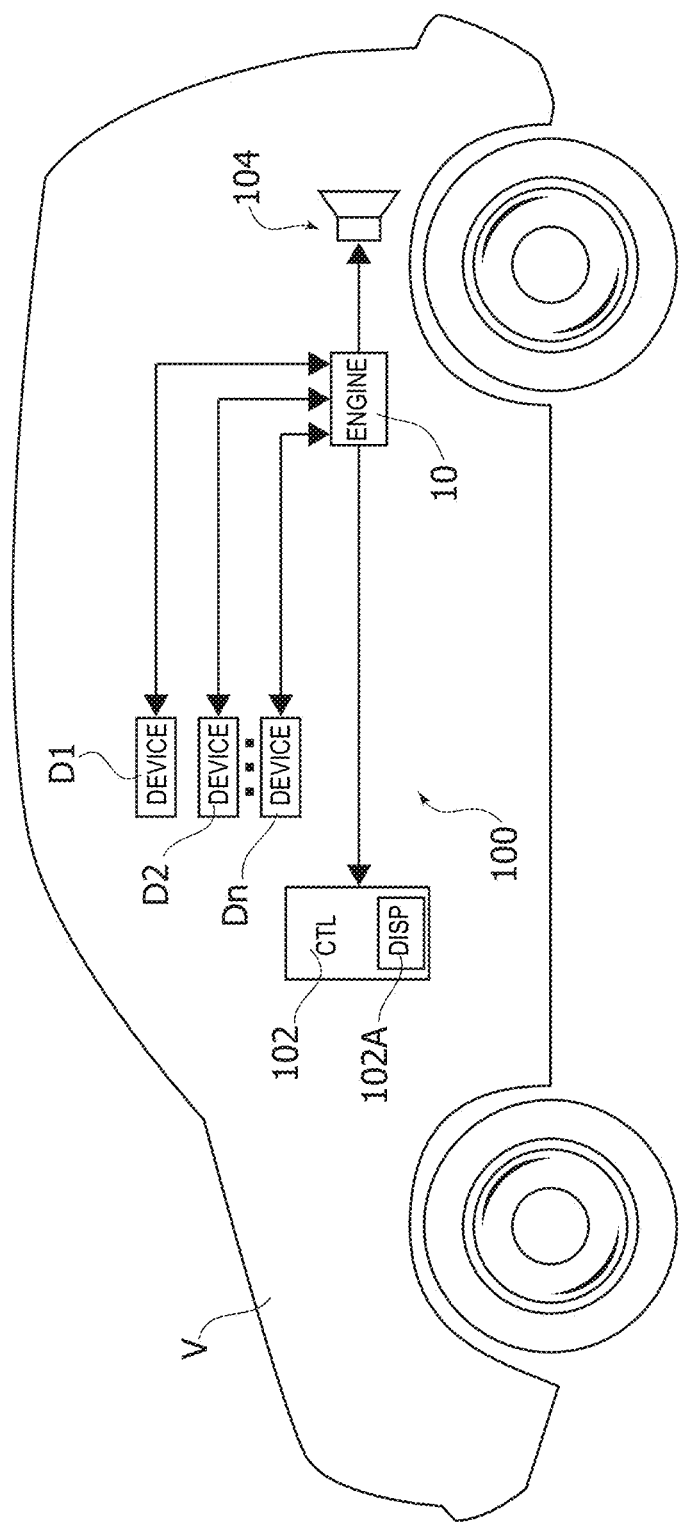
FIG. 1 is generally exemplary of a possible context of use of embodiments.

In the ensuing description, one or more specific details are illustrated, aimed at providing an in-depth understanding of examples of embodiments of this description. The embodiments may be obtained without one or more of the specific details, or with other methods, components, materials, etc. In other cases, known structures, materials, or operations are not illustrated or described in detail so that certain aspects of embodiments will not be obscured.

Reference to "an embodiment" or "one embodiment" in the framework of the present description is intended to indicate that a particular configuration, structure, or characteristic described in relation to the embodiment is comprised in at least one embodiment. Hence, phrases such as "in an embodiment" or "in one embodiment" that may be present in one or more points of the present description do not necessarily refer to one and the same embodiment. Moreover, particular conformations, structures, or characteristics may be combined in any adequate way in one or more embodiments. The headings/references used herein are provided merely for convenience and hence do not define the extent of protection or the scope of the embodiments.

Some embodiments of the present invention assist in providing improved media library management solutions which may adequately respond to customer expectations while keeping BOM specifications within boundaries compatible with infotainment applications in the automotive sector. One or more embodiments may be applied to real-time operating system (RTOS) media player applications for use in the car infotainment sector.

One or more embodiments may relate to a corresponding computer program product loadable in the memory of at least one processing circuit (e.g., a computer) and including software code portions for executing the steps of the method when the product is run on at least one processing circuit. As used herein, reference to such a computer program product is understood as being equivalent to reference to a computer-readable medium containing instruction for controlling the processing system in order to co-ordinate implementation of the method according to one or more embodiments. Reference to "at least one computer" is intended to highlight the possibility for one or more embodiments to be implemented in modular and/or distributed form.

One or more embodiments may provide a media library engine suited to be implemented in a scalable manner, with reduced memory requirements: by way of non-limiting example, a set of just two bytes of indexed tables may present a possible view of an infotainment system by the user with the capability of managing, for instance, 65,536 songs per media.

In one or more embodiments, indexes are maintained in the place of full parts, folder names and file names. For instance, in one or more embodiments, paths to the contents to be played (reproduced) can be built "on-the-fly", via an optional caching system for instance, and possibly querying the file system, when desirable.

In one or more embodiments, tables can be transferred (swapped) to a non-volatile memory, thus making it unnecessary to create them at each platform start-up.

One or more embodiments may include fast and late call-back mechanisms to facilitate achieving a good level of performance.

One or more embodiments may provide multi-language support, also for languages using non-Latin characters as disclosed, for instance, in Italian Patent Application 102018000002537.

FIG. 1 is exemplary of a vehicle (a motor-vehicle such as motor car, for instance) V equipped with an infotainment system 100.

The system 100 may include a set of devices D1, D2 . . . , Dn intended to act as sources of media contents (audio/video for instance). These contents are intended to be made available to a user (the driver or one or more passengers in the vehicle V) as a function of commands (possibly including voice commands), applied by such a user at a control unit 102. The devices D1, D2, . . . , Dn can comprise a wide variety of different devices: the non-limiting list of devices already discussed in the foregoing (USB, SDMMC, NAND, iAP, MTP, RAM disk devices) is exemplary of such devices.

For the sake of simplicity and ease of understanding, the following description will primarily refer to audio/sound contents (songs, for instance) desired to be reproduced via an audio system as schematically exemplified by a loudspeaker at 104 in FIG. 1.

Associated video contents (the title of the song being played, the performing artists, the relative album, genre, just to make possible examples) can also be displayed on a display unit 102A at the control unit 102, for instance. Again, it will be appreciated that referring to audio contents (and elementary video contents possibly associated therewith) is not to be construed, even indirectly, in a limiting sense of the embodiments. In fact, the embodiments may apply to any type of media contents and are primarily related to the structure and operation of an (essentially SW-based) media library management engine 10.

A basic purpose of an engine 10 as exemplified herein is to co-ordinate operation of the various parts of the infotainment system 100 in such a way that certain media contents (songs, for instance) as sourced by any of the devices D1, D2, . . . , Dn may be delivered (for instance, played at 104) in compliance with commands applied by a user at 102.

Figure 2:
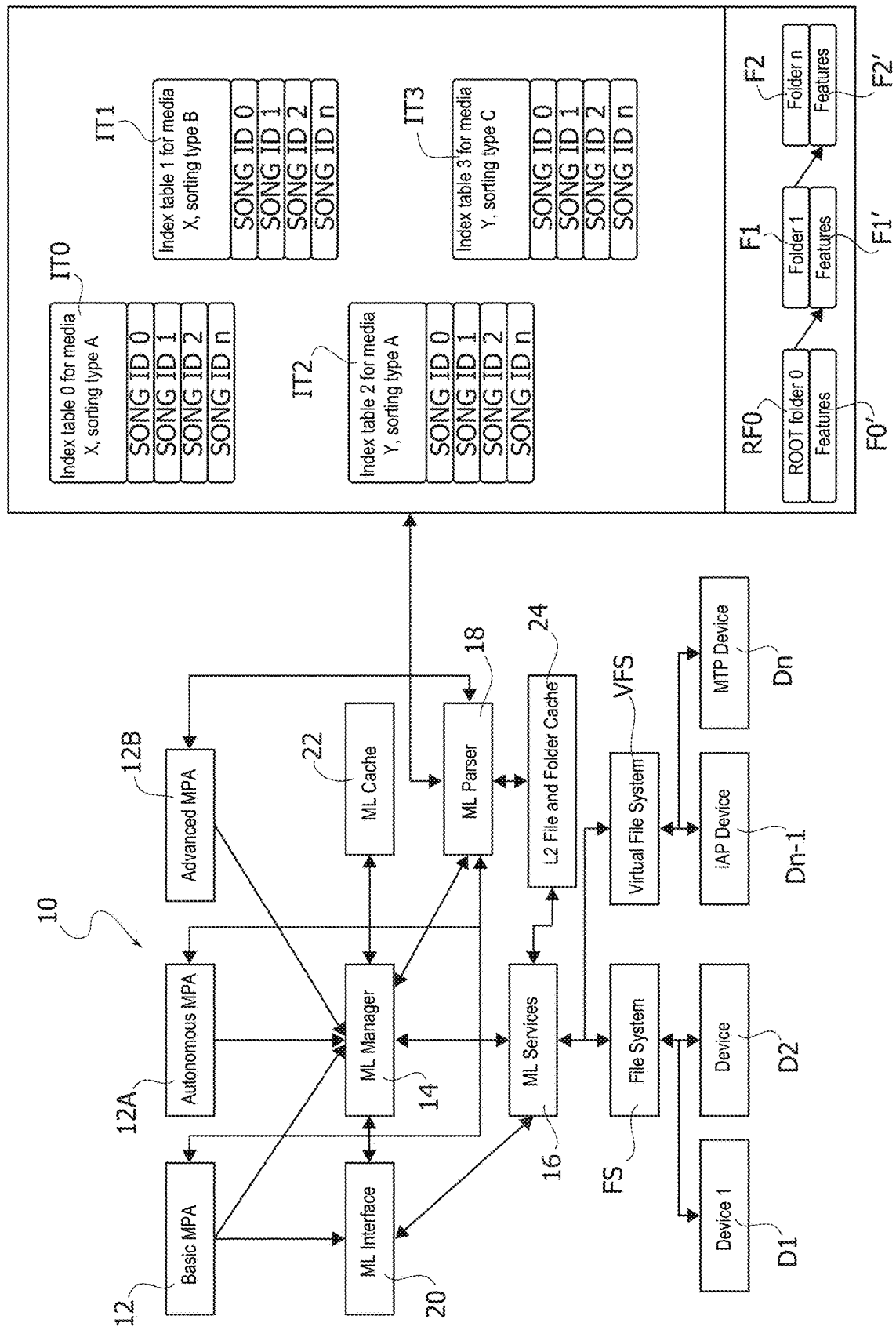
FIG. 2 is a block diagram exemplary of a possible environment of use of embodiments.

FIG. 2 is a block diagram exemplary of the "ecosystem" surrounding a media library management system (hereinafter "engine", for simplicity) as considered herein. At the bottom of FIG. 2, the devices D1, D2, . . . , Dn−1, Dn are represented together with an associated file system FS and a virtual file system VFS (this latter may be possibly involved in operation of source devices such as iAP devices and MTP devices).

As known to those of skill in the art, a file system controls how data in a library (database) are stored in order to be recalled (retrieved), with individual sets of data, designated "files", possibly grouped in "folders". The file system dictates the structure and logic rules used to manage the files. As exemplified herein, the file system FS (and possibly the virtual file system VFS) can provide access to media (audio and video, for instance) in a formatted way. It will be appreciated that the devices D1, D2, . . . , Dn−1, Dn and, possibly, the file systems FS, VFS, may be distinct element with respect to the engine 10 of the embodiments.

Starting from the top left portion of FIG. 2, reference 12 is exemplary of a "basic" media player application (MPA). This may be any known type of MPA which may include customer "flavor," that is features intended to be specific for a certain customer.

It is again noted that, as used herein, "customer" denotes a manufacturer/installer of the engine 10/system 100 who may desire the engine/system to include certain features intended to be unique to that customer.

To that effect, the basic MPA 12 may rely on an additional set of services provided by a specific additional layer. This may be the case, for instance, for file and folder manipulation.

As used herein, file denotes a certain file of media contents (a certain song, for instance) which may be regarded as included in folders (such as playlists as devised by/for a certain user) with the consequent possibility for the engine 10 to manage different folders, including different playlists for different users, for instance.

In embodiments as exemplified herein, the engine 10 may include (as a non-mandatory feature) an autonomous MPA, designated 12A, which may be configured, for instance, to request a path to a certain next/previous content (a certain song, for instance) from the media library manager block 14—discussed in the following—in addition to registering media to the framework of the media library manager and setting sorting modes—again as discussed in the following.

An advanced MPA, designated 12B (which again may include customer "flavor") may rely on low level layers of the media library for media and file ID manipulation. As noted, the advanced MPA may not be a mandatory feature of the embodiments; if present, it may integrate some services here considered as attributed to the media library manager block designated 14.

As exemplified herein, the media library manager block 14 is intended to combine a set of low-level services as exemplified by the block 16 while also being in charge of starting a media parser 18 as discussed in the following. In so doing, the media library manager block 14 can co-operate with a media library interface block 20. This is intended to rely on the media library manager 14 and the media library services 16 in order to provide additional manipulation services for MPA applications (especially of the basic type 12) which do not already integrate a full logic for that purpose.

Reference 22 denotes a media library cache (this can be referred to as a "L1" cache) which may be possibly provided in order to co-operate with the media library manager block 14 in reducing latency when retrieving a particular media content (song) path by relying on a set of x paths stored in the cache memory 22. Finally, reference 24 denotes a further cache memory possibly provided in support of the media library services block 16 and the parser 18) for instance to act as a "L2" cache memory acting as a file and folder cache.

As exemplified herein the media library parser 18 can be configured, as discussed in the following, to perform parsing of media (in a transparent manner to any "flavor" in the media player applications).

The parser block 18 is intended to build indexed tables (IT0, IT1, IT2, IT3, as discussed in the following, for instance) and provide feedback to the various MPAs when certain media content is parsed.

As discussed in the following, possible notifications from the parser 18 to the MPAs may include: a first call-back message ("fast" call-back): this indicates that (only) a certain number (a subset) of media content files has been parsed and sorted in a specified way; a second call-back message ("standard" call-back): this indicates that media content files in the library have been parsed in all the ways specified; and a third call-back message ("late" call-back): this indicates that the media content files have been parsed also in respect of possible tags (as applied to certain media contents by the user, for instance).

The right-hand side of FIG. 2 shows a possible arrangement of indexed tables, each including a certain list of media contents (songs, for instance, with respective identifiers ID0, ID1, ID2, . . . , IDn).

These indexed tables (ITX, in general, with X=0, 1, 2, and 3 considered here) may include, for instance: IT0: an indexed table 0 for media x (as provided by any of the devices D1, . . . , Dn) with a sorting type A; IT1: an indexed table 1 for media x (as provided by any of the devices D1, . . . , Dn) with a sorting type B; IT2: an indexed table 2 for media y (as provided by any of the devices D1, . . . , Dn) with a sorting type A; and IT3: an indexed table 3 for media y (as provided by any of the devices D1, . . . , Dn) with a sorting type C.

As discussed in the following in connection with FIGS. 6 to 8, indexed tables such as IT0, . . . , IT3, may comply with a dynamic folder description linked list (as exemplified in FIG. 2, bottom right) wherein a "root" folder 0 RF0 with associated features F0' may point to further folders F1, F2 through respective features F1' (from RF0 to F1) and F2' (from F1 to F2).

Figure 3:
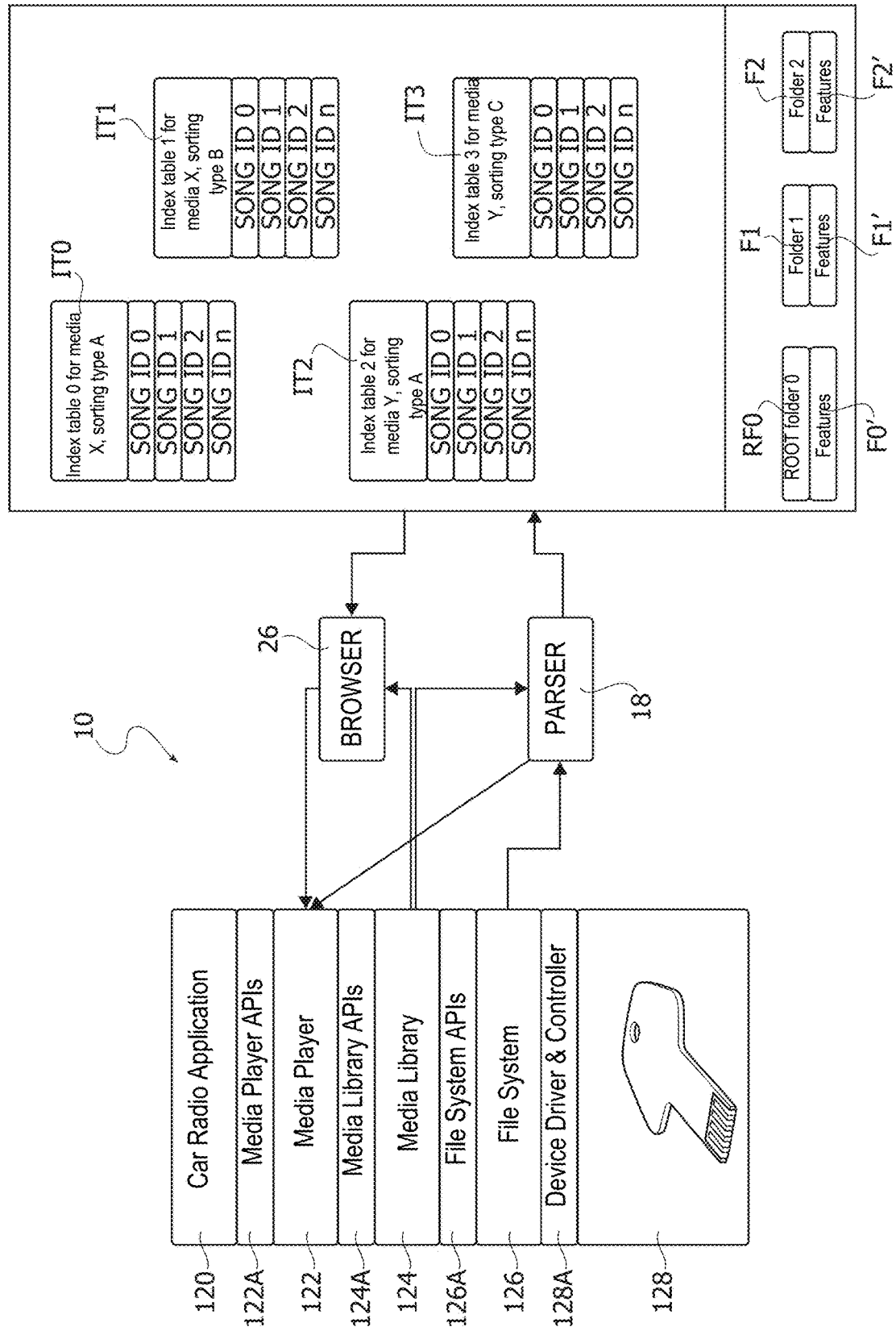
FIG. 3 is a functional block diagram exemplary of possible embodiments.

FIG. 3 is a functional block diagram representation of the engine 10 reproducing, on the left-hand side of the figure, a stack of applications including: an infotainment (car radio) application 120 interfacing with a media player 122 (see also 104 in FIG. 1) via media player application player interfaces (APIs) 122A; the media player 122 interfacing with a media library 124 via media library APIs 124A; the media library 124 interfacing with a file system 126 (see FS and VFS in FIG. 2) via file system APIs 126A; and the file system(s) 126 configured to control any of the devices D1, . . . , Dn (here designated 128 and exemplified as an USB stick or key) via a device driver and controller 128A.

As exemplified in FIG. 3, the parser 18 is configured to retrieve files and folder attributes on the basis of the file system(s) 126 and create therefrom the indexed tables IT0, . . . , IT3.

As exemplified in FIG. 3, the parser 18 is instantiated by the media library 124 which may likewise instantiate a browser 26 configured to read the indexed tables IT0, . . . , IT3 and return to the media player 122 media content delivery paths (paths to individual media files such as songs, for instance).

As exemplified in FIG. 3, the parser 18 may be configured to inform the media player 122 as to the extent of parsing completed at a certain moment, for instance by sending to the media player fast, standard and late call-back messages as discussed previously.

FIG. 4 is exemplary of a possible media library flow with emphasis placed on the tasks performed by the parser 18. In FIG. 4, block 181 is exemplary of a new media source (for instance a new device D1, . . . , Dn) being coupled to the media library framework and being registered as such by a MPA (12 in FIG. 2 can be considered for instance).

Once the new media queued, as soon as available for that purpose, the parser 18 may start parsing that new media content as exemplified at 182.

Block 183 in FIG. 4 is exemplary of sorted indexed tables being created by the parser and filled to cache memory as exemplified by 24 in FIG. 2.

For instance, as exemplified in the bottom part of FIG. 4, this may involve the formation of a (first) indexed table ITX for media y by adopting a certain type of sorting (generally designated type A, for instance) with the creation of a list of contents (songs, for instance) identified by respective identifiers ID0, ID1, . . . , IDn.

A corresponding folder FX descriptor can also be created having certain features FX' with these data stored in cache memory space as exemplified by 24.

As discussed previously, as soon as a first (sub)set of songs (media contents) are processed, a fast call-back can be sent to the media player 122 (see FIG. 3) so that as exemplified at 184, the MPA controlling the media library is advised of the possibility of browsing and playing such set of songs—that is, more generally, of reproducing a first set of media files in any possible sorted way (not including tags, as discussed in the following), as exemplified by block 185.

Block 186 is exemplary of the completion of the parsing task by the parser 18 leading to the newly added media contents having been parsed completely with a corresponding call-back message sent towards the media player 122 as discussed previously. In that way, the MPA in charge is advised of the possibility of browsing and reproducing all the media contents (playing all the songs, for instance) in any possible ways they may be sorted (again with the exception of tags).

Block 187 is exemplary of the (non-mandatory) possibility for the parser 18 to re-start parsing the newly added media for tag sorting. Such a process may be carried out at a later stage and with a lower priority with respect to other tasks in order to avoid adversely affecting the system performance.

Block 188 is exemplary of such possible additional (tag) parsing having been completed with a late call-back message sent towards the MPA level. In that way, as exemplified at 189, the MPA in charge advised the possibility of browsing and reproducing all the media content files (playing songs, for instance) by taking into account also tag instances.

FIG. 5 is another functional block diagram exemplary of media library flow placing emphasis on the role of the browser 26 of FIG. 3.

Block 261 is exemplary of the browser task 26 waiting for a call-back from the media library framework (for instance after instantiation of the browser 26 by the media library 124 in FIG. 3).

Block 261 is exemplary of the possibility for the browser 26 to start at 262 (as soon as a call-back is obtained from the media library framework) a sorting mode to a current media which may involve (as exemplified by block 263)) the application by the media library manager (see also block 14 in FIG. 2) of a user view as indicated by browser 26.

For instance, as exemplified at 264, the browser 26 may ask for previous/next media content files (songs, for instance) to be reproduced, which may result, as exemplified at 265, in the media library manager retrieving a path to media content files (songs, for instance) to be reproduced.

As exemplified herein this may occur via indexed tables such as IT0, . . . , IT3 as created by the parser 18 along the lines discussed previously, and via associated caches such as 24 and file system(s) such as FS and VFS in FIG. 2.

In that way, as exemplified at 266, the media player application—now aware of the path provided by the browser 26—may access a media content (song) via the path indicated by the browser and provide for delivery of the media contents (for instance, playing a song as selected).

Figure 6:
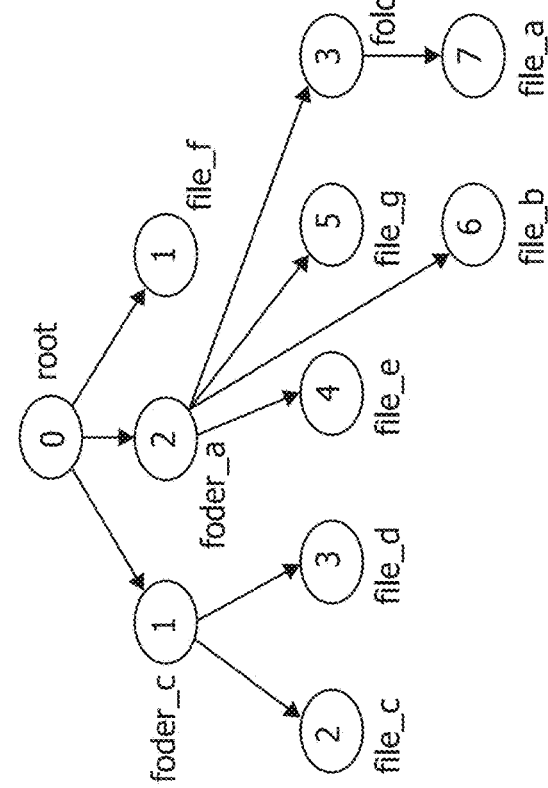
FIG. 6 is an example of file system tree in embodiments as per the present description.

FIG. 6 is exemplary of a possible use of indexes by the parser 18 making reference to a (purely exemplary) case of a file system tree related to a (purely exemplary) case of media content files: arranged in four folders, namely a root folder identified as 0 plus three (sub)folders namely folder_a, folder_b and folder_c, identified as 2, 3 and 1 in FIG. 6; including seven different files (songs, for instance) designated file_a, file_b, file_c, file_d, file_e, file_f and file_g.

FIG. 6 may be exemplary of sorting media files such as songs per file name, considering, for instance, six characters in the name. Of course, the number of characters considered is configurable. Also, ordering of both the folders (root, folder_a, folder_b, folder_c) and the files (file_a to file_f) may be completely independent of the numbering exemplified.

In one or more embodiments, the parser 18 may in fact perform the sorting through an intermediate table with the aim of creating an indexed table. Each time a folder is considered, certain auxiliary information may be (optionally) gathered to browse the three quickly without accessing the file system each time.

Figure 7:
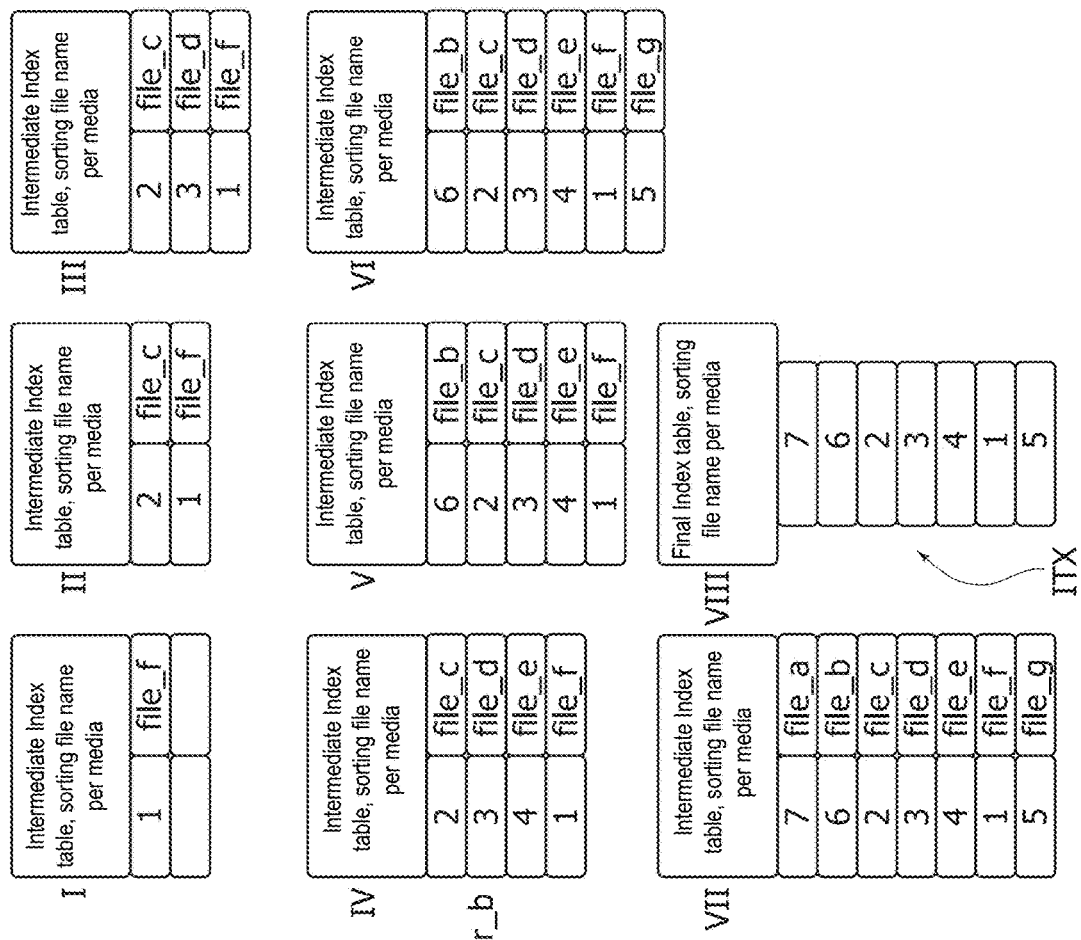

FIG. 7 is exemplary of a sequence of steps, numbered I to VIII, involving (by way of example) generating an intermediate indexed table sorting file names per media (that is for a certain device D1, . . . , Dn in the example considered).

The steps I to VIII in FIG. 7 are exemplary of the following acts:

I: a first file (that is a first song, here designated file_f) is found in the media library and an identifier ID1 is assigned thereto; a corresponding record is inserted in a temporary table;

II: a second file (file_c, for instance) is found and an identifier ID2 assigned thereto; a corresponding record is added to the table sorted per file name;

III: the same actions discussed previously are performed for a third file, namely file_d, with a record added to the table (sorted per file name, in the example considered) so that the file_d with ID3 is added to the table between file_f (ID1) and file_c (ID2), that is without following the index order;

IV: the actions discussed above are repeated for file_e which has identifier ID4 assigned thereto with a record added to the table, again assumed to be sorted per file name, independently of the sequence of the ID numbers;

V: the actions discussed above are repeated for file_b which has identifier ID6 assigned thereto with a record added to the table again assumed to be sorted per file name, independently of the sequence of the ID numbers;

VI: the actions discussed above are repeated for file_g which has identifier ID5 assigned thereto with a record added to the table again assumed to be sorted per file name, independently of the sequence of the ID numbers);

VII: the actions discussed above are repeated for file_a which has identifier ID7 assigned thereto with a record added to the table again assumed to be sorted per file name independently of the sequence of the ID numbers); and VIII: a final indexed table ITX (sorted by file and name) is obtained (see the tables IT0 to IT4 in FIG. 3 for immediate reference).

The (final) indexed table ITX (step VIII) can be created by copying the first column of the temporary table once completed (step VII) so that the temporary table—and the related memory space—can be made available for further use with the final indexed table of step VIII kept in volatile memory or transferred to a non-volatile memory such as the cache memory 24.

FIG. 8 is exemplary of the possibility (again referred to the file system tree exemplified in FIG. 6) of providing an indexed table ITX' which, contrary to the indexed table ITX of step VIII in FIG. 7 (which is assumed to be obtained by sorting file name per media) is obtained by sorting file names per folder.

A folder descriptor (for instance, a folder descriptor ID2) can be optionally maintained in a linked list which may be useful to facilitate quick navigation of the system three and to provide information about the three to upper application(s) without accessing the file system each time.

For instance, the Tables A, B and C reproduced below are exemplary of the possibility of associating to a certain descriptor (description) of a folder a certain value with such values kept in a memory (either volatile or non-volatile) as a table as exemplified in FIG. 9.

TABLE A

| Description (not in table) | Value |
|---|---|
| BaseFolder/Number | 2 |
| ParentFolder/Number | 0 |
| ChildFolder/Number | 3 |
| OldBrotherFolder/Number | 1 |
| YoungBrotherFolder/Number | 0 |
| YoungestChildFolder/Number | 3 |
| NumberOfFile | 3 |

TABLE B

| Description (not in table) | Value |
|---|---|
| NumberOfFolder | 1 |
| NumberOfPlaylist | 0 |
| FirstChildInFolder | 3 |
| BaseFolderDepth | 1 |
| FirstFileInFolder | 4 |
| FirstPlaylistInFolder | 0 |
| NextSortedFolderID | 3 |

TABLE C

| Description (not in table) | Value |
|---|---|
| PreviousSortedFolder | 0 |
| SortedPerFolderTableIndex | 0 |
| ... | |
| ... | |
| ... | |
| ... | |
| ... | |

In that way the descriptor/description is not listed in the table but—can be found—by referring to the value listed in the table. A high efficiency can be reached when record per folder is maintained.

Whatever the criteria used for sorting, indexed tables such as ITX, ITX' (such as indexed tables as exemplified at IT0, IT1, IT2, IT3 in FIG. 3) may permit the media library manager (see 14 in FIG. 2) to access the media library services 16 in FIG. 2 as discussed. Caching related data may facilitate avoiding accessing the file system(s) too often to retrieve the path to a specific media content (for instance a song to be played, with possible associated graphical information such as the song title) by communicating that path to the media player application so that the associated file can be accessed ("opened") and related media content made available (for instance with a corresponding song being played by the media player).

One or more embodiments facilitate achieving an adequate trade-off between memory area involved and performance level.

One or more embodiments can be configured (customized) as a function of parameters such as:
supported media (including iAP, MTP, CD-TEXT for audio CD)
number of files/folders/play-lists per media (for instance, the parser 18 may be stopped once a maximum number is reached)
tag extraction activation for MP3, WMA, FLAC, WAW, M4A, OGG, MP2, AIGG file formats, for instance.
activation of graphical (artwork) extraction in formats such as JPG, BMP, P,
media library interface activation for basic media player applications,
playlist support activation for formats such as XSFP, PLS, M3U, WPL, ASX,
longest file/folder path length,
highest number of characters per tag instance (author, artist, album, title, genre, comment, year, for instance),
maximum number of characters for CD-text,
cache activation for file, folder and play-list names,
maximum file, folder, play-list names,
file sorting per media,
file sorting per folder,
play-list sorting per folder,
folder sorting per media,
folder sorting per folder,
file sorting per play-list,
file and sorting per play-list,
sorting for MTP, iAP devices,
number of characters considered for sorting,
sorting per tag instance (author, artist, and so on,
multi-language sorting,
random scope rules,
working mode through a relative or absolute file system mode identifier.

One or more embodiments facilitate implementing media content (e.g. song) management options and associated databases consuming a reduced number of bytes of (volatile) memory.

One or more embodiments exhibit a high degree of scalability with capability of being applied to both basic and advanced sets of features.

One or more embodiments facilitate maintaining good performance in parsing and browsing media content.

By resorting to features such as the introduction of indexed tables and mechanisms such as fast call-back and late call-back mechanisms as discussed in the foregoing, one or more embodiments facilitate achieving one or more of the following goals:

providing a "smart" media library engine with low memory consumption, customized browsing admitted also for platforms exposed to memory leakage, capability of taking into account specific platform features and/or specific storage device features in defined domains.

The instant description is thus exemplary of a method of managing an automotive infotainment media library (for instance, 124 in FIG. 3) comprising media content files sourced from a set of source devices (for instance, D1, . . . , Dn in FIG. 2 or 128 in FIG. 3), wherein the media content files are accessible via respective playback paths (see, for instance, FS, VFS in FIG. 2 or 126 in FIG. 3) by at least one media player application (for instance, 12, 12A, 12B in FIG. 2 or 122 in FIG. 3) having a plurality of configurations (for instance, different customer "flavors", that is certain engine/system features unique to a customer).

A method as exemplified herein may comprise: parsing (see, for instance, 18 in FIGS. 2 and 3 and 181 to 189 in FIG. 4) the media content files in the media library to create (produce) at least one indexed table (for instance, IT0, IT1, IT2, IT3 or ITX, ITX'), the table including a respective list of identifiers (for instance, ID0, ID1, . . . , IDn) associated (that is, assigned or allotted) to media content files parsed as a function of at least one of a source device in the set of source devices and/or a configuration in the plurality of configurations of the at least one media player application and/or folders grouping the media content files in the media library; and activating the at least one media player application to access, via respective playback paths, media content files having associated thereto identifiers listed in the at least one indexed table (briefly: media content files listed in the at least one indexed table).

Reference being made herein to "at least one" indexed table is intended to highlight the fact that, while creating (producing) plural such tables has been discussed in the foregoing, one or more embodiments may contemplate creating even just one the indexed table including a (respective) list of identifiers such as ID0, ID1, . . . associated (that is assigned or allotted) the media content files.

Also, it will be appreciated that one or more embodiments are primarily concerned—with the provision of—a parsing feature for generating one or more indexed tables as discussed rather than with the adoption of specific criteria for selecting the source devices, the media player configurations or the folders on which parsing is based. In fact, a basic advantage of one or embodiments lies in being "transparent" to such criteria.

Whatever the parsing criteria adopted, using indexed tables is advantageous insofar as these tables only represent meta-information in comparison to the full paths used by a media player to deliver certain contents (playing a certain song/playlist, for instance).

For instance, identifiers can be stored in the form of numbers (for instance 16-bit numbers can be used to identify univocally more than 65,000 files in the place of respective paths, which are (much) more memory-consuming.

A conventional system would take (much) memory space to store (anew) that information (paths/song titles, for instance, possibly in full) plus the related meta-information (how to navigate the objects stored in the data base). By way of contrast, an identifier-based system can take into account only a univocal attribute (meta-information) without storing anew the same information, which is already present in the file system.

One or more embodiments can thus generate paths as desired "on-the-fly" based on (meta) information available at a certain time without having to keep it in storage with a corresponding memory requirement.

By way of (simple) example, generating a path may involve: evaluating an identifier (ID) for a next song to be played; searching, via the file system, the file corresponding to that ID, and setting up the path thereto.

This task can be alleviated by support from one or more cache memories, where at least part of the related information can be stored, thus avoiding or reducing accesses to the file system thus making path construction less consuming.

In a method as exemplified herein, the parsing may comprises a first parsing step (for instance, 182, 183) wherein a first subset of the media content files in the media library are parsed, the method comprising issuing a partial ("fast") callback message (for instance, 183) to the media player application indicating to the media player application availability for access via respective playback paths of the first subset of parsed media content files having associated thereto identifiers listed in the at least one indexed table.

In one or more embodiments, such fast-callback mechanism may lead to the media player being notified that a certain, possibly configurable, number of files (songs, for instance) has been analyzed. Selecting a low value for that number facilitates making the callback mechanism fast. The set of files (songs, for instance) notified can be presented in an un-ordered manner, or in a manner ordered as a function of the set di files analyzed at that moment (not the whole set available in the media library, which will be discovered at a later stage).

A method as exemplified herein may comprise, as a result of the parsing of the media content files in the media library being completed (for instance, 184), issuing a complete callback message (for instance, 185) to the media player application indicating to the media player application availability for access via respective playback paths (for instance, 186) of parsed media content files having associated thereto identifiers listed in the at least one indexed table.

In a method as exemplified herein: the media library may include media content files tagged via respective tags; the parsing may include tag-based parsing (for instance, 187) of the media content files listed in the plurality of indexed tables; and the method may comprise, as a result of the tag-based parsing completed, issuing a further ("late") callback message (for instance, 188) indicating to the media player application availability for access via respective playback paths of media content files having associated thereto identifiers listed in the at least one indexed table the media content files parsed also as a function of the tags.

Again, one or more embodiments are primarily concerned—with the possible provision of—the tag-based parsing feature rather than with the specific nature of these tags, conveying additional information available in the media content files. Such information may include (by once more referring to songs as non-limiting example of media content files) the author(s), the album, the genre, a playbill and so on.

Software-based extractors (known to those of skill in the art) can be used to extract that information by "opening" and processing the file. This may result in parsing being slowed down undesirably. For that reason, resorting to a low-priority "late" callback may be advantageous.

In a method as exemplified herein, access to the media content files in the media library may include browsing (for instance, 26) the media content files having associated thereto identifiers listed in the at least one indexed table wherein the browsing may comprise, with a current media content file having associated thereto an identifier listed in the at least one indexed table being accessed, retrieving (via the identifiers associated thereto: see, for instance, 265) in the at least one indexed table either one of a previously accessed media content file or a next media content file planned for access and making available (for instance, 266) to the media player application a playback path to the either one of the previous or next media content file in the media library.

In a method as exemplified herein, the parsing may comprise creating in the at least one indexed table a linked list (for instance, ITX') of folder descriptors to facilitate access to the parsed content files in the media library without accessing a file system for the media library.

A method as exemplified herein may include storing the at least one indexed table in a volatile memory and transferring the at least one indexed table to a non-volatile memory in view of use of the media library planned to be discontinued, wherein the at least one indexed table is preserved for subsequent re-starting of media library operation.

As exemplified herein, a managing system (for instance, 10) for an automotive infotainment media library comprising media content files sourced by a set of source devices wherein the media content files are accessible via respective playback paths by at least one media player application having a plurality of configurations, may be configured to implement the method as exemplified herein, and comprise:

parser circuitry (for instance, SW supported) configured to parse the media content files in the media library to create the at least one indexed table including a respective list of identifiers associated to media content files parsed as a function of at least one of a source device in the set of source devices and/or a configuration in the plurality of configurations of the at least one media player application and/or folders wherein the media content files are arranged in the media library;

memory circuitry (for instance, 24) for at least temporarily storing the at least one indexed tables; and browser circuitry (for instance, SW supported) to retrieve and make available to the at least one media player application respective playback paths to media content files in the media library having associated thereto identifiers listed in the at least one indexed table.

As exemplified herein, a computer program product loadable in a managing system for managing an automotive infotainment media library may comprise software code portions for implementing the steps of a method as exemplified herein.

In various embodiments, the methods described herein may be implemented, at least in part, using a processor coupled to a non-transitory computer readable medium, such as a memory. The non-transitory computer readable medium may include instructions executable by the processor to implement embodiment algorithms. The processor may include a central processing unit (CPU), a microprocessor, a microcontroller or other processing circuitry known in the art that is capable of executing machine readable instructions. In alternative embodiments, the methods described herein may be implemented using dedicated digital logic, programmable digital logic such as a field programmable gate array (FPGA), a digital signal processor (DSP), or other suitable digital hardware Without prejudice to the underlying principles, the details and embodiments may vary, even significantly, with respect to what has been described by way of example only, without departing from the extent of protection.

What is claimed is:

1. A method of managing an automotive infotainment media library comprising media content files sourced from a set of source devices, wherein the media content files are accessible via respective playback paths by at least one media player application having a plurality of configurations, the method comprising:
retrieving path names of media content files from a file system;
parsing the media content files in the media library to create at least one indexed table including a respective list of numeric identifiers associated to the path names of the media content files, wherein the media content files are parsed as a function of at least one of a source device in the set of source devices, as a function of a configuration in the plurality of configurations of the at least one media player application, or as a function of folders grouping the media content files in the media library, wherein the at least one indexed table includes a first indexed table including the numeric identifiers in a first sequence without the associated path names;
storing the path names of the media content files in a cache memory separate from the file system;
storing the first indexed table in a volatile memory separate from the file system and different from cache memory;
retrieving a first path name associated with a first numeric identifier on the first indexed table from the cache memory;
providing the retrieved first path name to the at least one media player application without accessing the file system; and
activating the at least one media player application to access via respective playback paths media content files having associated thereto numeric identifiers listed in the at least one indexed table.

2. The method of claim 1, wherein:
the parsing comprises parsing a first subset of the media content files in the media library in a first parsing step; and
the method further comprises issuing a partial callback message to the media player application indicating to the media player application availability for access via respective playback paths of the first subset of parsed media content files having associated thereto the numeric identifiers listed in the at least one indexed table.

3. The method of claim 1, further comprising, as a result of the parsing of the media content files in the media library being completed, issuing a complete callback message to the media player application indicating to the media player application availability for access via respective playback paths of parsed media content files having associated thereto the numeric identifiers listed in the at least one indexed table.

4. The method of claim 3, wherein:
the media library includes media content files tagged via respective tags;
the parsing includes tag-based parsing of the media content files listed in the at least one indexed table; and
the method further comprises, as a result of the tag-based parsing completed, issuing a further callback message indicating to the media player application availability for access via respective playback paths of media content files having associated thereto the numeric identifiers listed in the at least one indexed table the media content files parsed also as a function of the tags.

5. The method of claim 1, wherein:
access to the media content files in the media library includes browsing the media content files having associated thereto the numeric identifiers listed in the at least one indexed table; and
the browsing comprises, with a current media content file having associated thereto a numeric identifier of the numeric identifiers listed in the at least one indexed table being accessed, retrieving in the at least one indexed table either one of a previously accessed media content file or a next media content file planned for access and making available to the media player application a playback path to either one of the previously accessed media content file or the next media content file in the media library.

6. The method of claim 1, wherein the parsing comprises creating in the at least one indexed table a linked list of folder descriptors to facilitate access to the parsed content files in the media library without accessing the file system for the media library.

7. The method of claim 1, further comprising:
transferring the at least one indexed table to a non-volatile memory in view of use of the media library planned to be discontinued, wherein the at least one indexed table is preserved for subsequent re-starting of media library operation.

8. A managing system for an automotive infotainment media library comprising media content files sourced by a set of source, the system comprising:
parser circuitry configured to retrieve path names of media content files from a file system, parse the media content files in the media library to create at least one indexed table including a respective list of numeric identifiers associated to the path names of the media content files parsed as a function of at least one of a source device in the set of source devices and/or a configuration in a plurality of configurations of at least one media player application and/or folders wherein the media content files are arranged in the media library, wherein the at least one indexed table includes a first indexed table including the numeric identifiers in a first sequence without the associated path names;
cache memory circuitry configured to store the path names of the media content files in a cache memory separate from the file system;
volatile memory circuitry separate from the file system and different from the cache memory, the volatile memory circuitry configured to store the first indexed table and a volatile memory; and
browser circuitry configured to retrieve a first path name associated with a first numeric identifier on the first indexed table from the cache memory, provide the retrieved first path name to the at least media player application without accessing the file system, and make available to the at least one media player application, via respective playback paths, media content files in the media library having associated thereto the numeric identifiers listed in the at least one indexed table.

9. The managing system of claim 8, wherein the parser circuitry is further configured to:
parse a first subset of the media content files in the media library in a first parsing step; and
issue a partial callback message to the at least one media player application indicating to the media player application availability for access via respective playback paths of the first subset of parsed media content files having associated thereto the numeric identifiers listed in the at least one indexed table.

10. The managing system of claim 8, wherein the parser circuitry is further configured to:
as a result of the parsing of the media content files in the media library being completed, issue a complete callback message to the at least one media player application indicating to the media player application availability for access via respective playback paths of parsed media content files having associated thereto the numeric identifiers listed in the at least one indexed table.

11. The managing system of claim 10, wherein:
the media library includes media content files tagged via respective tags; and
the parsing circuitry is further configured to:
perform tag-based parsing of the media content files listed in the at least one indexed table, and
as a result of the tag-based parsing completed, issue a further callback message indicating to the media player application availability for access via respective playback paths of media content files having associated thereto the numeric identifiers listed in the at least one indexed table the media content files parsed also as a function of the tags.

12. The managing system of claim 8,
access to the media content files in the media library includes browsing the media content files having associated thereto the numeric identifiers listed in the at least one indexed table; and
the browsing circuitry is further configured to, with a current media content file having associated thereto a numeric identifier of the numeric identifiers listed in the at least one indexed table being accessed, retrieve in the at least one indexed table either one of a previously accessed media content file or a next media content file planned for access, and make available to the at least one media player application a playback path to either one of the previously accessed media content file or the next media content file in the media library.

13. The managing system of claim 8, wherein the parsing circuitry is further configured to create in the at least one indexed table a linked list of folder descriptors to facilitate access to the parsed content files in the media library without accessing a file system for the media library.

14. The managing system of claim 8, wherein the managing system further comprises:
a non-volatile memory, wherein the managing system is further configured to:
store the at least one indexed table in the volatile memory, and
transfer the at least one indexed table to the non-volatile memory in view of use of the media library planned to be discontinued, wherein the at least one indexed table is preserved for subsequent re-starting of media library operation.

15. A non-transitory computer readable medium having stored thereon instructions that, when executed by a processor, causes the processor to manage an automotive infotainment media library comprising media content files sourced from a set of source devices by executing steps comprising:
retrieving path names of media content files from a file system;
parsing the media content files in a media library to create at least one indexed table including a respective list of numeric identifiers associated to the path names of the media content files, wherein the media content files are accessible via respective playback paths by at least one media player application having a plurality of configurations, and wherein the media content files are parsed as a function of at least one of a source device in the set of source devices, as a function of a configuration in the plurality of configurations of the at least one media player application, or as a function of folders grouping the media content files in the media library, wherein the at least one indexed table includes a first indexed table including the numeric identifiers in a first sequence without the associated path names;
storing the path names of the media content files in a cache memory separate from the file system;
storing the first indexed table in a volatile memory separate from the file system and different from cache memory;
retrieving a first path name associated with a first numeric identifier on the first indexed table from the cache memory;
providing the retrieved first path name to the at least one media player application without accessing the file system; and
activating the at least one media player application to access via respective playback paths media content files having associated thereto the numeric identifiers listed in the at least one indexed table.

16. The non-transitory computer readable medium of claim 15, wherein
the parsing comprises parsing a first subset of the media content files in the media library in a first parsing step; and
the instructions, when executed by the processor, further cause the processor to issue a partial callback message to the media player application indicating to the media player application availability for access via respective playback paths of the first subset of parsed media content files having associated thereto the numeric identifiers listed in the at least one indexed table.

17. The non-transitory computer readable medium of claim 15, wherein the instructions, when executed by the processor, further cause the processor to, as a result of the parsing of the media content files in the media library being completed, issuing a complete callback message to the media player application indicating to the media player application availability for access via respective playback paths of parsed media content files having associated thereto the numeric identifiers listed in the at least one indexed table.

18. The non-transitory computer readable medium of claim 17, wherein:
the media library includes media content files tagged via respective tags;
the parsing includes tag-based parsing of the media content files listed in the at least one indexed table; and
the instructions, when executed by the processor, further cause the processor to, as a result of the tag-based parsing completed, issuing a further callback message indicating to the media player application availability for access via respective playback paths of media content files having associated thereto the numeric identifiers listed in the at least one indexed table the media content files parsed also as a function of the tags.

19. The non-transitory computer readable medium of claim 15, wherein:
activating the at least one media player application to access via respective playback paths media content files in the media library includes browsing the media content files having associated thereto the numeric identifiers listed in the at least one indexed table; and
the browsing comprises, with a current media content file having associated thereto numeric identifier of the numeric identifiers listed in the at least one indexed table being accessed, retrieving in the at least one indexed table either one of a previously accessed media content file or a next media content file planned for access and making available to the media player application a playback path to either one of the previously accessed media content file or the next media content file in the media library.

20. The non-transitory computer readable medium of claim 15, wherein the parsing comprises creating in the at least one indexed table a linked list of folder descriptors to facilitate access to the parsed content files in the media library without accessing a file system for the media library.

* * * * *